United States Patent [19]

Brookner et al.

(10) Patent No.: US 7,716,491 B2
(45) Date of Patent: May 11, 2010

(54) GENERATION AND MANAGEMENT OF CUSTOMER PIN'S

(75) Inventors: George M. Brookner, Norwalk, CT (US); Lorenz R. Frey, Zuchwil (CH)

(73) Assignee: Neopost Technologies, Bagneaux (FR)

( * ) Notice: Subject to any disclaimer, the term of this patent is extended or adjusted under 35 U.S.C. 154(b) by 1461 days.

(21) Appl. No.: 11/077,659

(22) Filed: Mar. 11, 2005

(65) Prior Publication Data

US 2005/0166061 A1 Jul. 28, 2005

Related U.S. Application Data

(62) Division of application No. 09/718,734, filed on Nov. 22, 2000, now abandoned.

(60) Provisional application No. 60/166,734, filed on Nov. 22, 1999.

(51) Int. Cl.
H04K 1/00 (2006.01)

(52) U.S. Cl. ........................... 713/184; 713/183

(58) Field of Classification Search ................. 713/184, 713/182–183
See application file for complete search history.

(56) References Cited

U.S. PATENT DOCUMENTS

| 4,453,074 A | 6/1984 | Weinstein | 235/380 |
| 4,629,872 A | 12/1986 | Hällberg | 235/380 |
| 4,924,514 A | 5/1990 | Matyas et al. | 705/71 |
| 5,097,505 A | 3/1992 | Weiss | 380/23 |
| 5,168,520 A | 12/1992 | Weiss | 380/23 |

(Continued)

FOREIGN PATENT DOCUMENTS

DE 4321849 A1 1/1995

(Continued)

OTHER PUBLICATIONS

"Handbuch der Chipkarten, 3. Auflage", Carl Hanser, Mar. 1999, 10 pages.

(Continued)

*Primary Examiner*—Jung Kim
*Assistant Examiner*—Samson B Lemma
(74) *Attorney, Agent, or Firm*—Townsend and Townsend and Crew LLP

(57) ABSTRACT

A method for securely generating a PIN comprises generating a number of random binary bits; determining the least significant bits of the number of bits; converting the least significant bits to a decimal integer; shifting the value of the integer by a predetermined constant to produce a shifted integer; and encoding the shifted integer as bits in a PIN block in accordance with a standard. A method for managing security of a PIN used to provide access to a secure device comprising choosing the PIN; storing an encrypted version of the PIN in the device; and communicating the PIN to a user of the device via a communication channel separate and apart from a channel reset to provide the device to the user. A method for resetting a PIN in a secure device comprising sending a message to a data center having an original PIN for the device, the message including authorization data indicative of at least one of the device and an authorized user of the device, and securely communicating the original PIN to the location of the device.

7 Claims, 3 Drawing Sheets

U.S. PATENT DOCUMENTS

| | | | |
|---|---|---|---|
| 5,228,084 A | 7/1993 | Johnson et al. | 380/23 |
| 5,276,735 A * | 1/1994 | Boebert et al. | 713/167 |
| 5,323,465 A * | 6/1994 | Avarne | 713/184 |
| 5,367,572 A | 11/1994 | Weiss | 380/23 |
| 5,436,972 A * | 7/1995 | Fischer | 380/286 |
| 5,627,355 A | 5/1997 | Rahman et al. | 235/380 |
| 5,642,401 A | 6/1997 | Yahagi | 379/58 |
| 5,754,652 A | 5/1998 | Wilfong | 380/24 |
| 5,875,394 A | 2/1999 | Daly et al. | 455/411 |
| 5,907,804 A * | 5/1999 | Schroderus et al. | 455/411 |
| 5,953,700 A * | 9/1999 | Kanevsky et al. | 704/270.1 |
| 6,280,328 B1 | 8/2001 | Holch et al. | 463/42 |
| 6,615,171 B1 * | 9/2003 | Kanevsky et al. | 704/246 |
| 6,668,323 B1 * | 12/2003 | Challener et al. | 713/183 |
| 6,868,497 B1 * | 3/2005 | Levy | 726/31 |
| 2003/0078989 A1 * | 4/2003 | Ladd | 709/218 |

FOREIGN PATENT DOCUMENTS

| | | |
|---|---|---|
| DE | 19705620 A1 | 9/1998 |
| EP | 0772164 A2 | 5/1997 |
| EP | 0780805 A2 | 6/1997 |
| FR | 2 577 704 | 4/1986 |
| GB | 2073661 A | 10/1981 |
| WO | WO88/01818 | 3/1988 |
| WO | WO 00/60551 | 10/2000 |

OTHER PUBLICATIONS

Markus G. Kuhn, probability theory for Pickpockets ec-PIN Guessing, Jul. 30, 1997 (http://qqq.cl.cam.ac.uk/~mgk25/ec-pin-prob.pdf).

* cited by examiner

WHERE:
C=CONTROL FIELD          4-BIT BINARY NUMBER 0001
N=PIN LENGTH             4-BIT BINARY NUMBER WITH PERMISSIBLE VALUES 0100 (4) TO 0110 (6)

P=PIN DIGIT              4-BIT FIELD WITH PERMISSIBLE VALUES 0000 (ZERO) TO 1001 (9)
P/T=PIN/TRANSACTION DIGIT   DETERMINED BY PIN LENGTH
T=TRANSACTION DIGIT      4-BIT BINARY NUMBER 0000

GENERATION AND MANAGEMENT OF CUSTOMER PIN'S

CROSS-REFERENCE TO RELATED APPLICATIONS

This application is a divisional of U.S. patent application Ser. No. 09/718,734, filed on Nov. 22, 2000 now abandoned.

This application claims priority of provisional patent application Ser. No. 60/166,734 filed on Nov. 22, 1999.

BACKGROUND OF THE INVENTION

1. Field of the Invention

This invention relates to the generation and management of Personal Identification Numbers (PIN's). More particularly, it relates to the generation and management of PIN's for use in various applications; and more specifically still, in postage franking devices.

2. Background Art

There are many business and personal financial transactions that must be conducted securely. It is very common for a Personal Identification Number, or PIN to be used to enhance the security of these transactions.

While the use of PIN's generally proceeds smoothly, there are occasional problems. If a PIN holder or customer writes down a PIN, it is subject to discovery by unauthorized users. If it is not written down, the customer may forget the PIN. This requires contacting the financial institution or company having the PIN in its database, and utilizing a PIN reset procedure. It is often necessary for the customer to travel to the location of the company, present identification which must be verified, and then select a new PIN.

SUMMARY OF THE INVENTION

It is an object of the invention to provide a secure method for generating PIN's.

It is another object of the invention to provide an apparatus for securely holding a PIN to help safeguard funds on deposit.

It is yet another object of the invention to provide, a convenient way to reset a PIN if a customer loses the PIN.

In accordance with the invention a method for securely generating a PIN comprises generating a number of random binary bits; determining the least significant bits of the number of bits; converting the least significant bits to a decimal integer; shifting the value of the integer by a predetermined constant to produce a shifted integer; and encoding the shifted integer as bits in a PIN block in accordance with a standard, for example the ISO 9564-1 standard.

The number of random bits may be sixty-four. The number of least significant bits may be sixteen. The constant may be 173845. The PIN block may include a control field; a PIN length designation field; a series of PIN digit fields; at least one PIN/transaction digit; and a series of transaction digit fields. Each PIN digit field may represent a binary number having a decimal value of from zero to nine. The control field may be the binary number 0001. The PIN length field may contain a binary number having a decimal value of four, five or six. Thus, at least one PIN/transaction digit is determined in accordance with PIN length. The transaction digit fields may each be four bit binary fields representing a decimal digit of zero to nine. The generation of the number of random binary bits may be accomplished by using a pseudo random number generator.

The invention is, also directed to a method for managing security of a PIN used to provide access to a secure device comprising choosing the PIN; storing an encrypted version of the PIN in the device; and communicating the PIN to a user of the device via a communication channel separate and apart from a channel used to provide the device to the user. Preferably, the communication channel is a secure channel, which may be rendered secure by using encryption.

In one embodiment the user of the device chooses the PIN. The manufacturer of the device may cause the encrypted version of the PIN to be stored in the device. The manufacturer may retain a record of the PIN or may discard all records of the PIN.

The PIN may be chosen using a random process, including the one set forth above.

In accordance with the preferred embodiment the device is a postal security device, which stores the value of funds.

The invention also encompasses a method for resetting a. PIN in a secure device comprising sending a message to a data center having an original PIN for the device, the message including authorization data indicative of at least one of the device and an authorized user of the device, and securely communicating the original. PIN to the location of the device. Preferably, the device has a current PIN, which is replaced with the original PIN. The communicating of the original PIN may comprise sending the original PIN to the user of the device; and the user of the device entering the original PIN into the device. Communication is preferably performed using secure communication. The channels may be rendered secure using secure communications techniques, such as encryption.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

The present invention may be used in a broad range of applications. However, for purposes of illustration, it will be described with reference to an apparatus for electronically holding value corresponding to funds, and in particular funds used for generating postage to be applied to items to be mailed. Such a device is often called a Postal Security Device (PSD), or a SAFE™ when produced by Ascom Hasler Mailing Systems.

Figure 1:
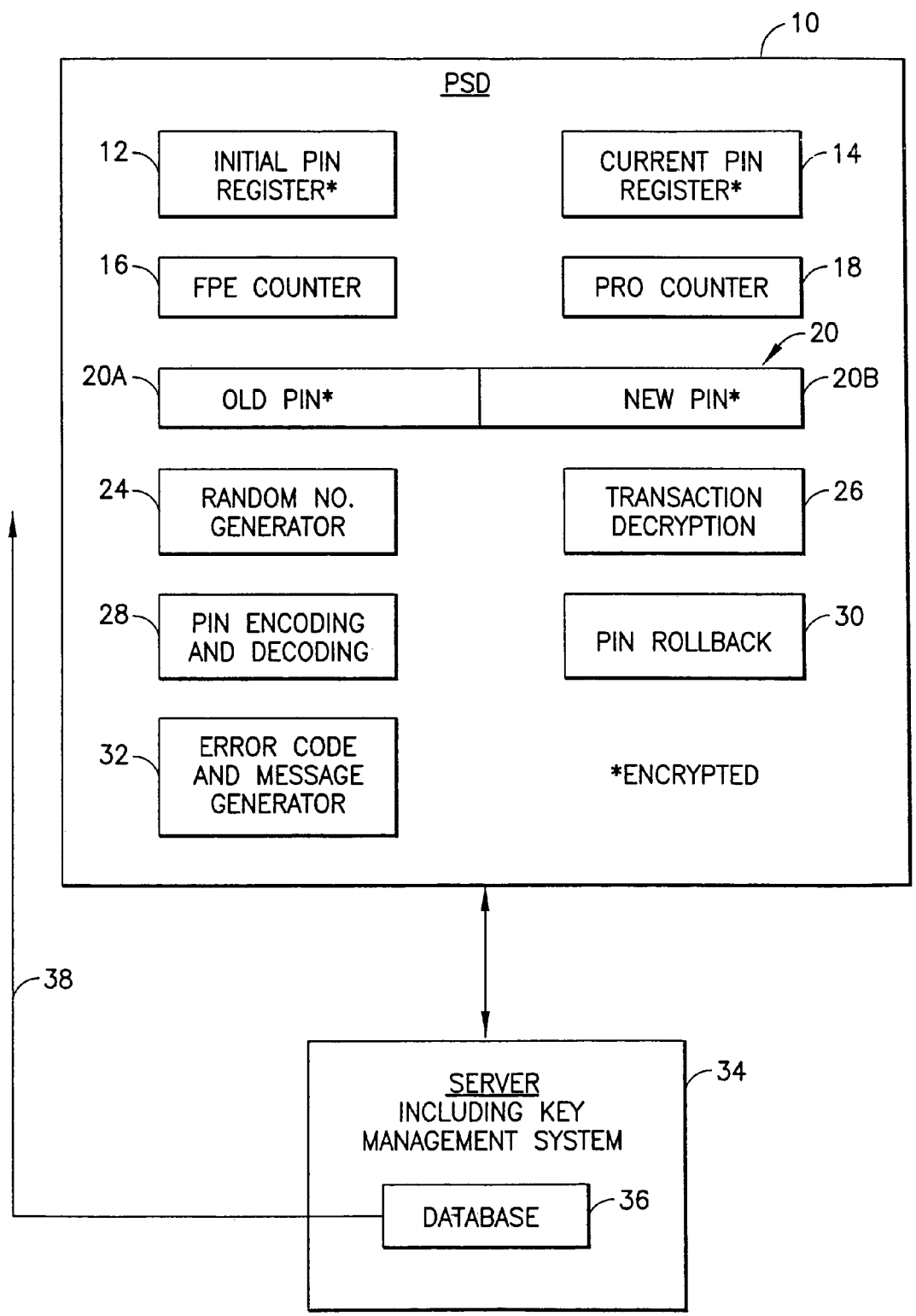
FIG. 1 is a block diagram of a funds storage device connected to a management system server, both in accordance with the invention.

Referring to FIG. 1, a PSD 10 in accordance with the invention has various hardware and software (or firmware) components. The hardware components include a housing and an electrical connector for connection to PSD 10, (both not represented in FIG. 1). Internal components include an initial PIN register 12 for storing an encoded initial PIN value, for the lifetime of the product. A current PIN register 14 stores an encoded currently valid PIN. A counter 16 counts the number of false PIN entries (FPE). Another counter 18 counts the number of PIN reset operations (PRO). A temporary storage register 20 permits storage of old (still valid) PIN at 20A and a new PIN number at 20B to enable roll-back.

Software components or modules in PSD 20 include a random bit generator 24 and a transaction decryption module 26 to enable decryption of transaction data. The transaction data is typically decrypted by running a 2-key triple-DES (Data Encryption Standard) of a type well known in the art. A separate encoding/decoding function 28 is used for the encoding and decoding of customer PIN data. A roll-back capability 30 is available for PIN modification and/or PIN reset procedures, as more fully described below. An error code and message generator 32 is available to allow a user of the PSD to read error codes which indicate possible system errors, and messages as also more fully described below. An additional communication path 38 is provided from database 36 to PSD 10, and is used as also more fully described below.

As more fully described below with respect to FIG. 2, PSD 10 generates an initial PIN which is transmitted to a server 34 at the manufacturer of PSD 10. Server 34 includes a key management system, not described herein. It also includes a database 36, for storing the value of the PIN, as also more fully described below.

Figure 2:
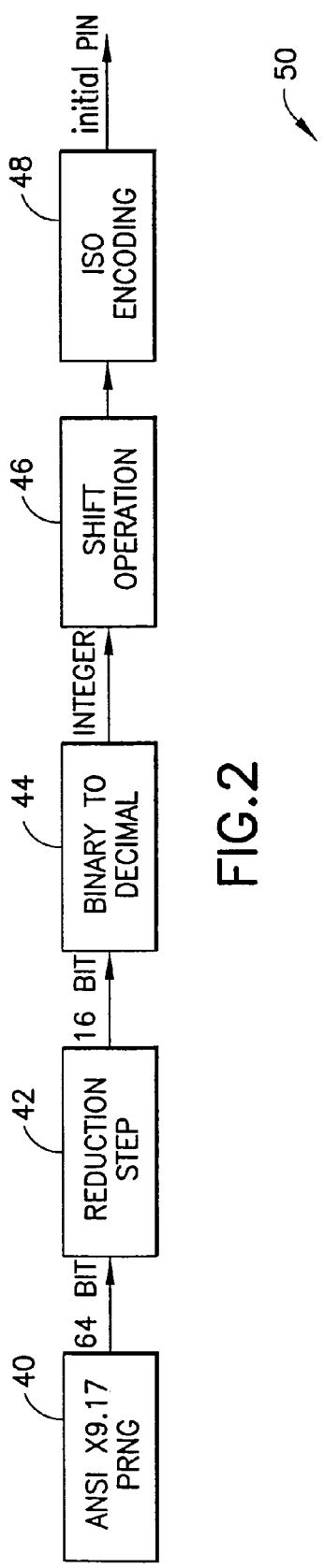
FIG. 2 is a flow diagram illustrating the generation of a PIN in accordance with the invention.

Referring to FIG. 2, the generation of a PSD specific initial PIN takes place during PSD initialization, generally at the manufacturer of the PSD. Using the present random bit generator 24 which may operate in accordance with the ANSI X9.17 standard, a number of random bits, generally sixty-four in number, are generated at 40. All but the least significant bits, preferably sixteen, are discarded at a bit reduction step 42. At step 44 the binary data of the remaining bits from step 42 are converted from binary to decimal form. Since the encryption step generates random bits, the integers resulting from the truncation are uniformly distributed in the interval of 0 to 65,523 for the selection of sixteen bits. Thus, the cryptographic strength of the initial PIN is 16 bits.

At step 46 a shift operation is conducted to guarantee that the initial PIN's resulting from the conversion step are all six digit integers with a lending digit that is not equal to, zero. Thus, what are intermediate integer values from step 44, are all shifted to the right by an arbitrarily chosen integer constant. For sixteen bits, this constant may be chosen as 173,845. After this shift, the initial PIN's are uniformly distributed in the interval 173,845 to 239,380.

At step 48 the initial PIN defined at step 46 is encoded according to a standard. PIN encoding following the encoding rules for the ISO/IEC ISO 9564-1 standard are illustrated in FIG. 3.

Figure 3:
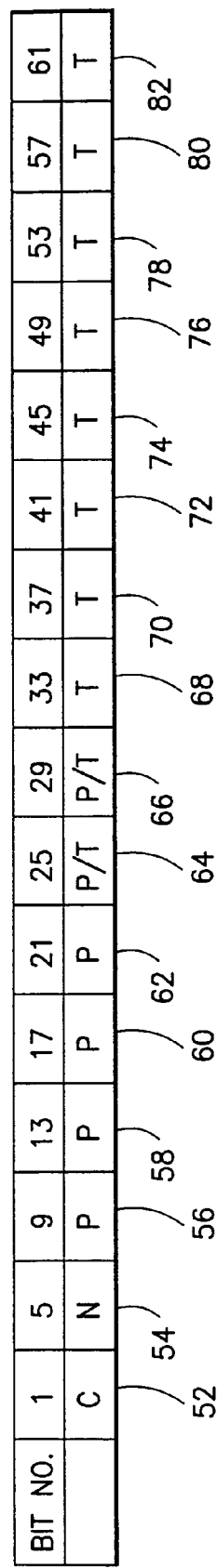
FIG. 3 is a diagram of a PIN block in accordance with the invention.

In FIG. 3, a PIN block 50 which is sixty-four bits in length includes numerous fields. A four bit control field 52 occupies bits 1-4 and is assigned a value of 0001. A pin length field 54, which occupies bits 5-8, contains a four bit binary number with permissible values of binary 0100 to binary 0110 (decimal 4-6). Four PIN digit field 56, 58, 60 and 62 occupy digits 9-12, 13-16, 17-20, and 21-24, respectively. These four 4-bit fields generally have permissible values of binary 0000 to 1001 (decimal zero to nine). However, as previously mentioned, due to the shift to the right (step 46 of FIG. 2) field 56 can never have a value of zero.

Fields 64 and 66 which occupy digits 25-28 and 29-32, respectively are used as either PIN digit fields or transaction digit fields, depending on the length of the PIN. For a six digit PIN, fields 64 and 66 are PIN digit fields. For a five digit PIN, field 64 is a PIN digit field and field 66 may be used as transaction digit field. For a four digit PIN, both of fields 64 and 66 may be used as a transaction digit field. Fields 68, 70, 72, 74, 76, 78, 80 and 82, which occupy block digits 33-36, 37-40, 41-44, 45-48, 49-52, 53-56, 57-60 and 61-64, respectively are all transaction digits, all of which may be 0000. Fields 52, 54 and all transaction digit fields designated as T add redundancy to the PIN value and help to guarantee the uniqueness and integrity of the PIN. There is no difficulty in padding the 64 bit block with zero, because the length of the PIN is encoded in field 54, and is well defined, and it is known that the PIN block always has a length of exactly sixty-four bits.

In operation, the PSD 10 is connected to the customer host system typically a mail franking system, and is used in a manner well known in the art. The host system has appropriate software for accessing and running PSD 10. Functions that are performed by the host system include encoding of PIN values, encryption of PIN data by running two key triple Data Encryption Standard (DES) and erasure of all PIN data temporarily stored during the customer PIN related operations.

The customer is authenticated using a PIN based mechanism. The PIN is set to a PSD individual initial value in the initialization phase. This value is made known to the customer using a communication path (path 38 of FIG. 1) which is different from the path used for shipping of the PSD itself. The customer is expected to change the PIN when using the PSD the first time. Typical common sense security rules, such as not using birthdays or a sequence of keyboard numbers or letters, changing the PIN periodically, etc. should be used by customers in selecting a new PIN.

The PSD is configured to require the PIN, to be entered each time after powering up. The PSD also requires the PIN authentication procedure to be performed again each time the synchronization at the serial interface between the PSD and the host system gets lost. This event indicates to the PSD that it might have been moved to a different host system.

PIN authentication must be performed before any indicia application function is allowed by the PSD (indicia generation and TMS activities). In other words, before doing many franking of mail, or receiving funds from a telemetering system, the PIN must be authenticated.

Whenever a specific consecutive number of authentication failures has occurred (as counted in counter 16 of FIG. 1) the PIN authentication function is locked, which effectively prevents the access to the indicia generation. However, the manufacturer of the PSD may reset the PIN at any time, or provide instructions to the customer as to how to reset the PIN, or cause the PIN to autoreset after a predetermined dormant period.

In order to ensure the effectiveness of the PIN based customer authentication, the PIN shall in general be entered by the customer manually into the host system, which transfers the PIN to the PSD. However, operational needs may require the PIN to be stored externally, e.g. in the host system, and used in an automatic authentication procedure (e.g. prepared scripts). This may be done only if the customer has ensured that the PSD and the host system is protected against theft and misuse by appropriate physical, organizational and/or other technical means.

A session based encryption key established after power up is used to encrypt the PIN before it enters the PSD. Thus, a great advantage of the present invention is that the original PIN, in a clear readable format, is never stored in the PSD, nor transmitted from the PSD.

In the discussion that follows of PIN verification, PIN modification and PIN reset procedures the notation and symbols set forth below are used.

$PIN_{init}$ denotes the initial PIN.

$PIN_{cust}$ denotes the valid Customer PIN.

$PIN_{ref}$ (Reference PIN) denotes the PIN value used by the PSD for customer authentication.

$PIN_{tr}$ (Transaction PIN) denotes the PIN value entered by the customer (e.g. via keyboard in the customer host system).

$PIN_{new}$ (new Customer PIN) denotes a new PIN value chosen by the customer and entered as a replacement for the old value.

$PIN'_{xxx}$ denotes 64-bit PIN block corresponding to $PIN_{xxx}$ as discussed above with respect to FIG. 3.

The symbol $\|$ denotes the concatenation of data elements.

The symbol $\oplus$ denotes the bit-wise XOR operation.

In the PIN verification procedure, the following general, assumptions apply:

The customer knows the currently valid PIN ($PIN'_{cust}$).

At the beginning of the procedure the PSD keeps the currently valid, encoded PIN ($PIN'_{cust}$).

The PIN verification procedure, processes and data flows are illustrated below:

As discussed above, the following message formats may be generated by the PSD, to provide information to the user of the customer host system:

| Message $M_0$ | |
|---|---|
| $M_0 := S$ | |
| $S$ : | 64 bits, random binary data |
| Message $M_1$ | |
| $M_1 := R$ | |
| $R$ | 128 bits, random binary data |
| Message $M_2$ | |
| $M_2 := PIN'_{tr}$ | |
| $PIN'_{tr}$ | 4-6 digit decimal number |

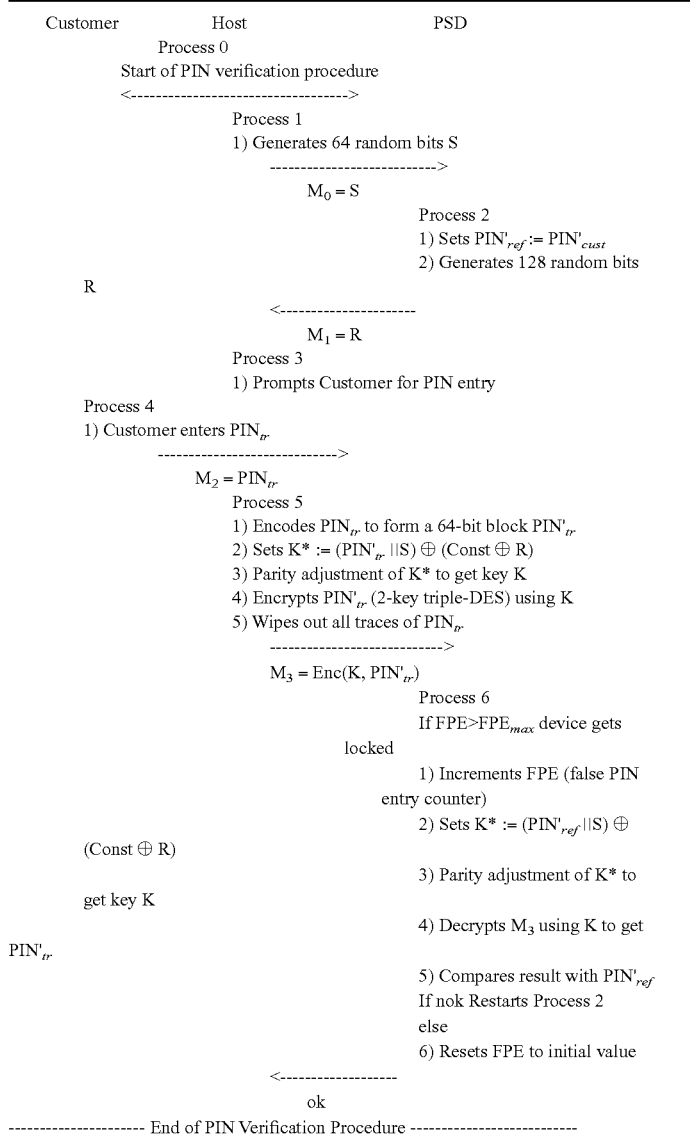

-continued

Message $M_3$ $M_3 := Enc(K, PIN'_{tr})$
$M_3$     64 bits, random binary data
K     2-key triple-DES key
$PIN'_{tr}$     64 bits, specially encoded data (cf. Annex A)

Process, details of step 5 of the PIN verification procedure set forth above in Process 5 are set forth below.

Step 2: Const is a 128 bit hard-coded random constant:
(e.g. Const(hex.)=0x 8B44F7AF 895CD7BE FFFF5BB1 49B40821).

Step 4: 2-key triple-DES is run in CBC-mod with IV(hex.)= 0x 242070 DB 49B40821.

As part of process 6, the customer must be informed in a clear and unequivocal way about the remaining number of PIN entry trials before the PSD gets locked and the possibility to wait for a predefined time period after which the FPE is reset.

A PIN modification procedure is used because the initial PIN values set during the initialization of the PSD, and thought mainly as transport protection, should be changed with this procedure before the device becomes operational. However, in general, this is, not enforced technically but only recommended to the customer in an appropriate way. The PIN modification procedure assumes that:

1. The customer knows the currently valid PIN ($PIN_{cust}$);
2. At the beginning of the procedure the PSD keeps the currently valid, encoded PIN ($PIN'_{cust}$);
3. During the procedure the PSD must temporary handle, at the same time, the old PIN value and its replacement in order to enable a roll-back of the procedure; and
4. After the procedure has been successfully executed the PSD stores the encoded new Customer PIN, while the old value is deleted.

As an additional security feature of the PIN modification procedure, there is an integrity check of the new PIN value. The value must be entered twice to assure accuracy before it is accepted. The PIN modification procedure, processes and data flows are set forth below.

```
Customer         Host                    PSD
          Process 0
          Start of PIN modification procedure
          <------------------------------------>
                  Process 1
                  1) Generates 64 random bits S
                  ------------------------>
                          $M_0 = S$
                                  Process 2
                                  1) Sets $PIN'_{ref} := PIN'_{cost}$
                          $M_1 = R$   2) Generates 64 random bits R
                          <------------------------
                  Process 3
                  1) Prompts Customer for entry of old and new PIN
          Process 4
          1) Customer enters $PIN_{tr}$ and $PIN_{new}$ (twice!)
          ------------------------------------>
                  $M_2 = PIN_{tr}, PIN_{new}, PIN*_{new}$
                          Process 5
                          1) Compares two values $PIN_{new}$ and $PIN*_{new}$
                              If not equal Restarts Process 3
                              else Verifies correct format of $PIN_{new}$
                              If nok Restarts Process 3
                              else
                          2) Encodes $PIN_{tr}$ to form a 64-bit block $PIN'_{tr}$
                          3) Encodes $PIN_{new}$ to form a 64-bit block $PIN'_{new}$
                          4) Sets $K^* := (PIN'_{tr} || S) \oplus (Const \oplus R)$
                          5) Parity adjustment of $K^*$ to get key K
                          6) Encrypts $PIN'_{new}$ (2-key triple-DES) using K
                          7) Wipes out all traces of $PIN_{tr}$ and $PIN_{new}$
                          ---------------------------------->
                                  $M_3 = Enc(K, PIN'_{new})$
                                          Process 6
                                          If $FPE > FPE_{max}$ device gets
                                  locked
                                          1) Increments FPE (false PIN
                                  entry counter)
                                          2) Sets $K^* := (PIN'_{ref} || S) \oplus$
          $(Const \oplus R)$
                                          3) Parity adjustment of $K^*$ to
          get key K
                                          4) Decrypts $M_3$ using K to get
          $PIN'_{new}$
                                          5) Checks correct format of
                                  result
                                              If nok Restarts Process 2
                                              else
                                          6) Resets FPE to initial value
                                          7) Sets: $PIN'_{cust} = PIN'_{new}$
                                              (erases old value!)
                                  ok
                          <----------------
---------- End of PIN Modification Procedure --------------------
```

The following error conditions are defined:

0: no error
1: Two values $PIN_{new}$ and $PIN*_{new}$ are different (process 5, step 1)
2: $PIN_{new}$ does not have the correct format (process 5, step 1) The PIN does not satisfy the length requirements and/or begins with a zero and/or consists of all equal digits.
3: PIN verification failed because $PIN'_{ref} \neq PIN'_{tr}$ (process 6, step 5)

For the PIN modification procedure the following message formats apply:

Message $M_0$ $M_0 := S$
S :     64 bits, random binary data
Message $M_1$ $M_1 := R$
R     128 bits, random binary data
Message $M_2$ $M_2 := PIN_{tr}, PIN_{new}, PIN*_{new}$
$PIN_{tr}$     4-6 digit number
$PIN_{new}$     4-6 digit number
$PIN*_{new}$     4-6 digit number
Message $M_3$ $M_3 := Enc(K, PIN'_{new})$
$M_3$     64 bits, random binary data
K     2-key triple-DES key
$PIN'_{new}$     64 bits, specially encoded data (cf. Annex A)

Process details for process 5, are the same as set forth above.

As part of process 6, the customer must be informed in a clear and unequivocal way about the remaining number of PIN entry trials before the PSD, is locked and the possibility of waiting for a predefined time period after which the FPE (FIG. 1) is reset.

In step 5 checking the correct format here means a verification, that the result of the decryption is a valid PIN block.

Since $PIN'_{ref}$ is part of the encryption key K in the PSD, the chance that a valid PIN block results from the decryption of $M_3$ is negligibly small ($<10^{-10}$) if a false value for the Customer PIN ($PIN_{tr}$) was used as part of the encryption key K in the host. This is due to the large amount of added redundancy contained in a valid PIN block, as described above.

Generally, it is a matter of contractual agreement between the manufacturer and its customers as to under what circumstances a PIN reset procedure is allowed.

Generally, the manufacturer does not halve any control over what happens to the customer PIN and how carefully the host, is set up, and therefore can take no responsibility for the customer PIN.

The reset procedure described below is therefore intentionally kept simple because the basic security assumption is, that the customer is fully responsible for the correct handling of the PIN. That is, a reset of the PIN should actually never be necessary under normal conditions.

The PIN reset procedure is based on the following general assumptions:

1. The PIN reset procedure consists of a preparatory, intermediate and the final step.

2. The customer does not know the currently valid PIN ($PIN_{cust}$).

3. At the beginning of the procedure the PSD stores the currently valid, encoded PIN ($PIN'_{cust}$) and the encoded initial PIN ($PIN'_{init}$) value set during the PSD initialization phase.

4. During the final step the PSD must temporary handle, at the same time, the old PIN value and its replacement in order to enable a roll-back of the procedure.

5. After the reset procedure has been successfully executed the PSD stores the encoded new Customer PIN value, while the old value is deleted.

6. The encoded initial PIN ($PIN'_{init}$) value stored in the PSD is not affected (changed, deleted, overwritten) by the procedure.

A manual PIN reset procedure is also provided. In a first step the customer contacts the manufacturer's remote control facility and informs the manufacturer of the situation. This may happen using different communication means such as fax, email, phone etc. This step includes an identification/authentication of the company, customer (name, address, license ID etc.) and the involved device (PSD manufacturer ID, PSD serial no., PSD model ID etc.) and should be logged in an appropriate way.

An intermediate step includes a verification of the customer/company data gathered, during the preparatory step and the checking of the authorization for PIN reset operations. Then, the initial PIN is retrieved from the database, and the customer and/or his company are informed in an confidential way about the value of the initial PIN (e.g. by fax, registered mail or email). If verification cannot be accomplished the process is stopped.

As a final step, processes and data flows for PIN reset are shown below.

The initial PIN used by, the customer during the final step for authentication, should be changed as part of the PIN reset operation in a manner similar to the case when the PSD is used for the first time. However, this is not enforced technically but only recommended to the customer in a appropriate way (e.g. as part of process 3).

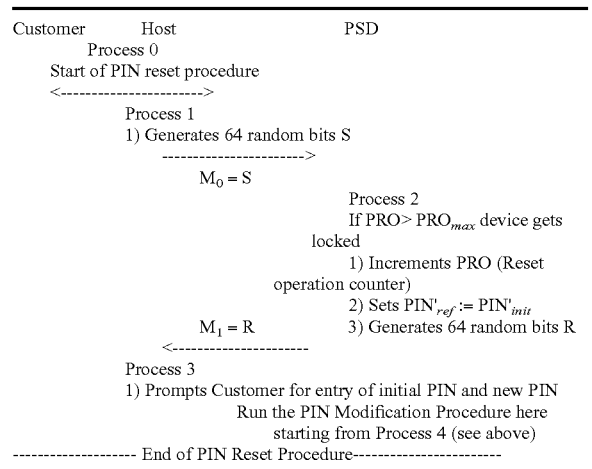

As part of process 2 immediately above, the customer must be informed in a clear and unequivocal way about the remaining number of reset operations before the PSD is locked.

Figure 4:
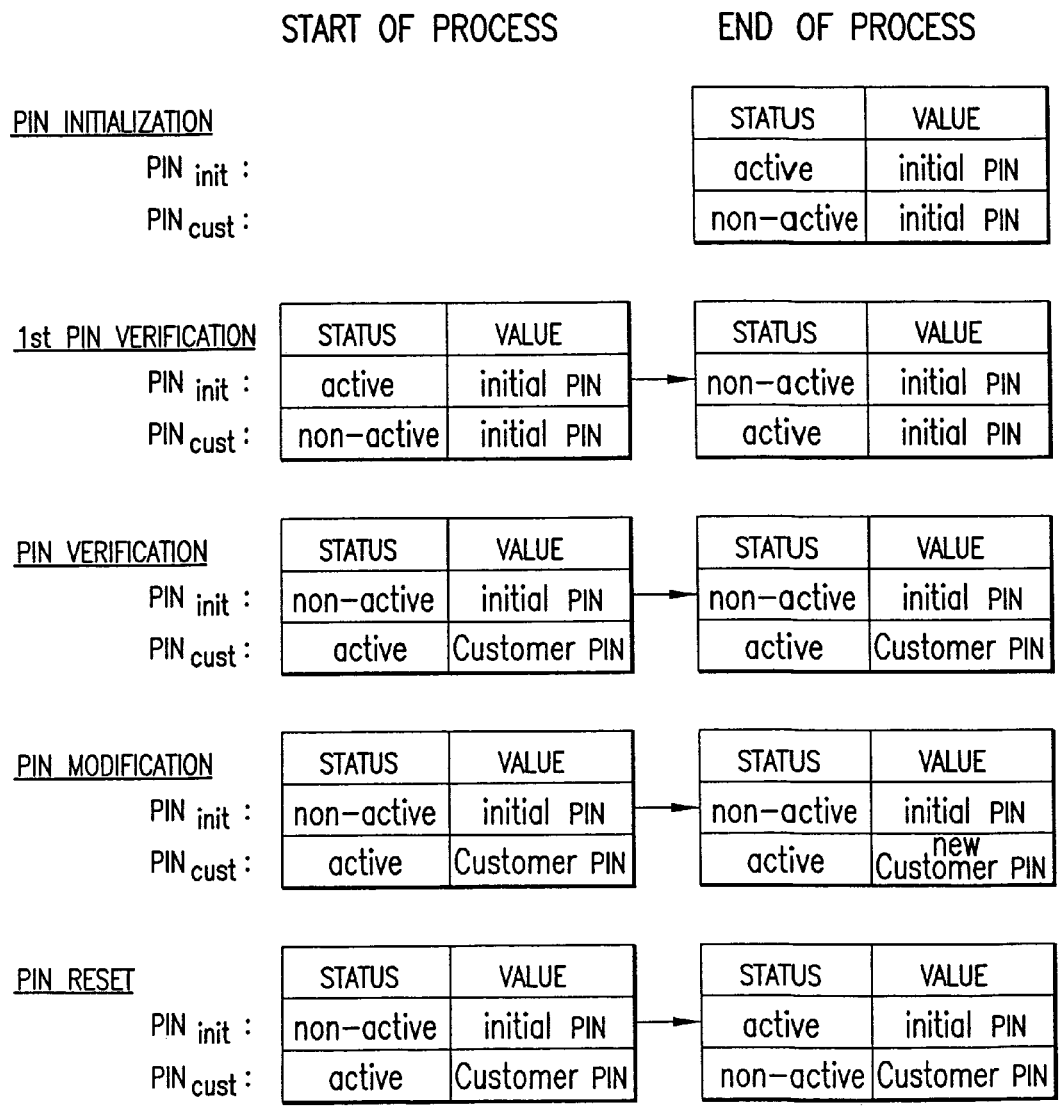
FIG. 4 is a chart illustrating PIN states and values in accordance with the invention.

Referring to FIG. 4, and based on the above discussion, the various PIN states and values which exist are illustrated for PIN initialization, the first PIN verification, subsequent PIN verification, PIN modification, and PIN reset.

In accordance with the invention, there are a variety of ways in which the security of the PIN can be managed in addition to those disclosed above. Another possibility is for the customer, when ordering the PSD, to specify a customer chosen sequence of digits for which the customer takes responsibility. This may be some sequence of special significance to the customer, but as noted above, should be selected in accordance with common sense security guidelines. This customer selected PIN is then encoded and placed in the PSD in its encoded form as the original PIN used for shipping. As noted above, it should be changed when the PSD arrives at the customer.

There are two possibilities for what can be done in the situation where the customer supplies the PIN. In a first case, it can be treated in the same manner as a randomly generated PIN. Its value can be stored in database 36 (FIG. 1), and if the customer has difficulties and needs to obtain the PIN, the manufacturer can provide the data, as described above or using the procedure outlined below. However, for additional security, it is possible to erase all traces of the PIN value from the manufacturer's site, and in particular from server 34 and database 36. In principle, since it was the customer who provided the initial PIN, the customer should be able to furnish it in cases where it becomes necessary, without consulting with the manufacturer. In this case, once the PSD has been shipped to the customer, and all traces of it have been eliminated from the manufacturer's records, the manufacturer no longer has any security obligations whatsoever with respect to the PIN.

It will be recognized that even if the manufacturer supplies the initial PIN, as described above, it is possible for the manufacturer, after shipping the PSD to the customer and sending the PIN by a separate communication channel (which may be encrypted), to discard all traces of the PIN. However, this is a rather extreme case, perhaps reserved for situations in which very high levels of security need to be maintained. In this case, if the initial PIN is lost, it may not be possible to again access the PSD.

In a preferred embodiment for the PIN reset procedure, at the time the customer needs to recover the initial PIN of the PSD due to loss of the present PIN, the customer causes, via modem or internet connection between PSD host and provider or manufacturer data center, the PSD to remotely communicate with the data center for the purpose of providing the data center with knowledge secured via secret and/or public key authentication standards of private information relating to the PSD (e.g. device identification, authorization number, account number, or the like). Once the data center authenticates the PSD, the data center causes the initial PIN (archived in its server database) to be securely communicated to the requesting PSD. The PSD thereafter would have, in its PIN memory, the initial manufactured PIN, reintroduced. The customer would then be informed by an alternate method (email, FAX, telephone) of the initial PIN value. Thereafter, the customer would proceed to change the PIN to the user desired value. It will be recognized that this PIN reset procedure lends itself well to automation, so that the PIN in the PSD can be automatically reset to the original PIN upon an authorized request communicated by the user. As an additional security feature, a dedicated telephone number for a particular customer may be maintained.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for resetting a PIN in a secure device comprising:
    sending a message to a data center having an original PIN for said device, said message including authorization data indicative of the device and an authorized user of said device,
    informing the authorized user of a remaining number of reset operations, and
    securely communicating the original PIN to the location of the device,
    wherein at least one of sending the message to the data center having the original PIN for said device and securely communicating the original PIN to the location of the device are performed using at least one of a secure communication channel and secure communication techniques.

2. The method of claim 1, wherein the device has a current PIN, the method further comprising replacing the current PIN with the original PIN.

3. The method of claim 1, wherein the communicating of the original PIN comprises:
    sending the original PIN to the user of the device; and
    the user of the device entering the original PIN into the device.

4. A method for resetting a PIN in a secure device comprising:
    sending a PIN reset request message to a data center, the data center having an original PIN for said device, said message including authorization data indicative of the device and an authorized user of said device;
    informing the authorized user of a remaining number of reset operations,
    receiving the original PIN by a secure communication from the data center; and
    replacing a current PIN of the device with the original PIN,
    wherein at least one of sending the message to the data center having the original PIN for said device and receiving the original PIN from the data center are performed using at least one of a secure communication channel and secure communication techniques.

5. The method of claim 4, further comprising:
    receiving a remaining number of available reset operations.

6. A method for resetting a PIN in a secure device comprising:
    receiving a PIN reset request at a data center, the data center having an original PIN for said device, said message including authorization data indicative of the device and an authorized user of said device,
    informing the authorized user of a remaining number of reset operations, and
    securely communicating the original PIN to the location of the device,
    wherein at least one of receiving the message at the data center having the original PIN for said device and securely communicating the original PIN to the location of the device are performed using at least one of a secure communication channel and secure communication techniques.

7. The method of claim 6, further comprising sending a PIN reset to replace a current PIN of the device with the original PIN.

* * * * *